Sept. 5, 1939.  A. E. YOUNG  2,171,779
CONE ROLLER FOR POTATO DIGGERS AND THE LIKE
Filed March 9, 1938
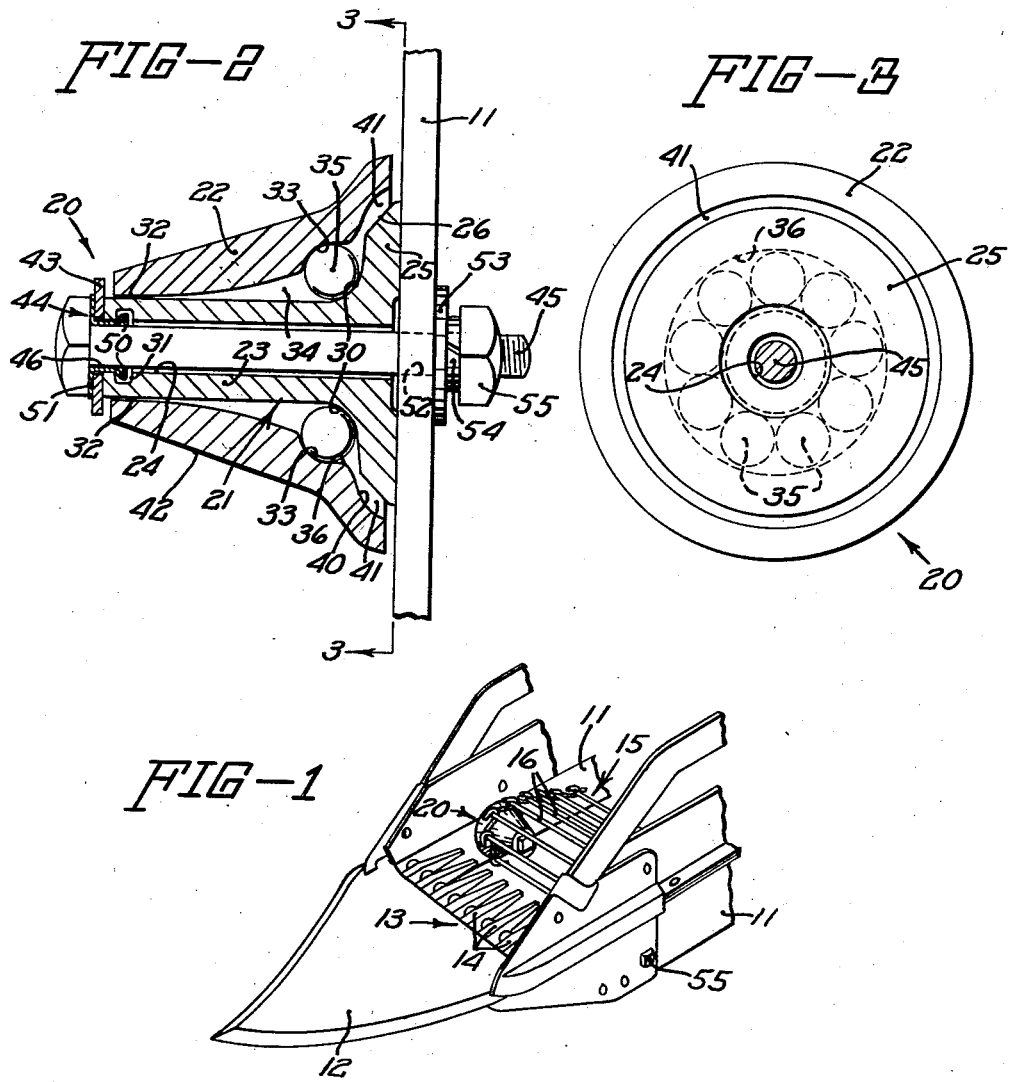
INVENTOR.
AUSTIN E. YOUNG
BY
ATTORNEYS Patented Sept. 5, 1939

2,171,779

UNITED STATES PATENT OFFICE 2,171,779

CONE ROLLER FOR POTATO DIGGERS AND THE LIKE

Austin E. Young, Syracuse, N. Y., assignor to Syracuse Chilled Plow Company, Inc., Syracuse, N. Y., a corporation of New York Application March 9, 1938, Serial No. 194,841

7 Claims. (Cl. 55—51)

The present invention relates to potato diggers of the type comprising a shovel and endless rod elevator which agitates and cleans the harvested potatoes, and is more particularly concerned with the lower cone rollers over which the rod elevator is trained.

In the conventional pototo digger, the lower end of the rod elevator is disposed immediately behind the shovel and is adapted to receive all of the material scooped up by the shovel. The rods comprising the elevator are so spaced that the greater part of the loose soil falls through immediately, while soil that clings to the potatoes is shaken loose in the course of travel up the elevator and falls through, leaving clean potatoes at the delivery end of the elevator. From the foregoing it will be seen that the lower cone rollers over which the rod elevator is trained are constantly exposed to and sometimes completely buried under the flow of material picked up by the shovel. Heretofore such cone rollers have been journaled on plain bearings and numerous experiments indicate that the power required to drive the elevator of a rod elevator type digger is determined largely by the frictional resistance of the roller turning on its spindle. Soil getting into the bearings frequently causes the roller to bind and stick, greatly increasing the consumption of power required to drive the elevator.

With the above in view, it is the principal object of the present invention to provide a roller which is adapted to operate under the conditions described without appreciable interference from soil that enters into the bearing surfaces. In the accomplishment of this object, I have journaled the roller on a spindle, using both a plain bearing and a ball bearing, the latter being of such construction as to permit a limited amount of axial movement of the roller relative to the spindle. Clearance has been provided between the roller and spindle at the ball bearing end, leaving an aperture through which soil that has entered the bearing may be ejected. The action of the ball bearing is to break up and pulverize any soil that might work its way into the bearing, while the outward thrust on the roller caused by the elevator running on the sloping side of the roller together with the gradually increasing clearance between roller and spindle causes the intruding soil to be worked down to the ball bearing end away from the plain bearing end.

Another object of my invention is to provide a ball bearing roller which may be assembled as a unit before mounting on the implement, thereby eliminating the difficulty of handling the two separable elements together with a number of loose balls. This is accomplished by using a retaining washer which is secured at one end of the spindle by means of a spring clip, thereby holding the roller and spindle together until the mounting bolt is passed through and bolted to the implement frame.

These and other objects and advantages will become apparent after consideration of the following detailed description of a preferred embodiment of the present invention, reference being had to the appended drawing, in which Figure 1 is a perspective view of a portion of a potato digger showing one of my improved lower cone rollers in operating position;

Figure 2 is a cross section taken through the axis of the roller drawn to enlarged scale; and Figure 3 is a view taken along the line 3—3 in Figure 2.

Referring now to the drawing, the potato digger shown in Figure 1 comprises a pair of laterally spaced side members 11 extending downwardly and forwardly to a triangularly shaped shovel 12 which is fixedly connected to the ends thereof. Disposed immediately behind the shovel 12 is a stone trap 13 comprising a plurality of rearwardly extending fingers 14 which act to prevent stones from becoming wedged between the shovel and the rod elevator.

The rod elevator, indicated in its entirety by the reference numeral 15, includes an endless conveyor made up of transversely disposed rods 16, the ends of which are bent at right angles and hooked together in a manner well known in the art. The upper end of the conveyor is trained over a driving roller or sprocket (not shown) which may be driven in any suitable manner, while the lower end of the conveyor is trained over a pair of cone rollers 20 fixed to the inside of the members 10 and 11.

Each of the cone rollers 20 comprises a spindle 21 and a bell-shaped roller 22 journaled thereon. The spindle 21 is provided with a cylindrical shank 23 having a bolt hole 24 through the center thereof, and a radially outwardly flared base 25 which is beveled, as at 26, around its edge. The junction of the cylindrical shank 23 with the base 25 is shaped to form an annular ball race 30. A circumferentially disposed groove 31 is provided within the spindle near the other end thereof, the purpose of which will be disclosed shortly.

The bell-shaped roller 22 is journaled adjacent its tapered end as at 32 on the shank 23 of the spindle, and the inner wall of the roller diverges therefrom back to an annular ball race 33 formed in the flared end of the roller 22, leaving a space 34 between the roller and spindle. A plurality of balls 35 are disposed between the races 30 and 33 in such manner that when the roller 22 is thrust axially in the direction of the spindle base 25, a line drawn through the points of contact of any one of the balls 35 with the races 30 and 33 forms an acute angle with the axis of the spindle. Thus it will be seen that the ball bearing described herein is adapted to resist both radial and end thrusts, while the plain bearing at 32 acts to stabilize the roller 22. The outer race 33 curves into and becomes a cylindrical bearing surface 36 which is co-axial with the cylindrical shank 23 and spaced therefrom the distance of the diameter of the balls 35. This permits the roller 22 to move a short distance axially away from the spindle base 25 while maintaining a radial contact between roller, spindle, and balls. The skirt of the bell-shaped roller 22 is flared outwardly, as at 40, leaving an opening 41 between the skirt and the beveled edge 26 of the spindle, which extends outwardly to the end of the roller.

As will be readily seen in Figure 2, the small end of the roller terminates a short distance back from the end of the spindle shank, the purpose being to provide for a limited amount of axial movement of the roller on the spindle. Normally, the wedging action of the rod elevator 15 riding over the conical surface 42 of the roller 22 causes the latter to be thrust against the base end of the spindle, but when particles of soil work their way into the bearings the roller 22 is able to move out slightly to accommodate the foreign material while the balls 35 break up and pulverize the soil. Centrifugal force created by the rotating roller 22, together with gravity, causes the pulverized soil to pass out through the opening 41. Th amount of axial movement of the roller 22 away from te spindle base 25 is limited by a retaining washer 43 which is held against the end of the spindle shank 23 by a spring clip 44 and the head of a mounting bolt 45. The washer 43 extends radially beyond the edge of the spindle shank 23, bearing against the end of the roller 22 when the latter is thrust in that direction.

For ease and convenience in handling and mounting the roller assembly, I have provided the spring clip 44 which holds the retaining washer 43 in position until the mounting bolt 45 is secured in place. The spring clip 44 comprises a sleeve portion 46 having a number of spring fingers 50 adapted to snap into the groove 31, and a radially extending flange 51 which bears against the washer 43. The spindle, balls, and roller are first assembled in their proper relations and the washer 43 placed against the end of the spindle shank. The spring fingers 50 are then bent inwardly and passed through the aperture in the washer 43 and bolt hole 24 until they spring into the groove 31, locking the clip 44 and washer 43 into place. The entire roller assembly may then be handled as a unit without danger of the roller and spindle separating and the balls 35 dropping out. The roller assembly is then mounted in place on either of the implement side members 11 by passing the mounting bolt 45 through the sleeve portion of the clip 44, bolt hole 24, and aperture 52 in the side member 11. A washer 53, lock washer 54, and nut 55 are placed on the threaded end of the mounting bolt 45, and the nut 55 is drawn up tight, clamping the spindle base 25 rigidly against member 11.

What I claim is:

1. A conveyor roller assembly for potato diggers comprising a spindle having a cylindrical shank and an outwardly flared base defining a ball race at the junction thereof, a bell shaped roller rotatably mounted on said spindle, said roller being journaled at its small end on the shank of said spindle and having a second ball race formed in the flared end thereof in complementary relation to said first mentioned ball race, and a plurality of balls disposed between and bearing against said ball races, said balls acting to pulverize soil that has entered said bearings, said roller and said spindle having clearance therebetween to provide an opening for the escape of pulverized soil.

2. A conveyor roller assembly for potato diggers comprising a spindle having a cylindrical shank and an outwardly flared base defining a ball race at the junction thereof, a bell shaped roller rotatably mounted on said spindle and movable axially thereon, said roller being journaled at its small end on the shank of said spindle and having a second ball race formed in the flared end thereof in complementary relation to said first mentioned ball race, a plurality of balls disposed between and bearing against said ball races for pulverizing soil that has entered said bearings, said races having co-axial cylindrical bearing portions permitting a limited amount of relative axial movement, said roller and spindle having an opening formed therebetween for passage of pulverized soil, and means for limiting the axial movement of said roller.

3. A unitary ball bearing comprising an inner race, an outer race, a plurality of balls disposed between and bearing against said races to limit axial movement of the outer race in one direction, means for limiting axial movement of said outer race in the opposite direction to prevent separation of the component parts while mounting or handling the bearing, said means comprising a retaining washer engageable with the end of said inner race and extending radially outward therefrom to a position adapted to bear against the end of said outer race, spring clip means for holding said washer in place, and means for mounting said ball bearing.

4. A unitary ball bearing comprising an inner race having an aperture through the center thereof and a circumferentially disposed groove near one end of said aperture, an outer race, a plurality of balls disposed between and bearing against said races to limit axial movement of the outer race in one direction, means for limiting axial movement of said outer race in the opposite direction to prevent separation of the races and loss of the balls while handling or mounting the bearing, said means comprising a retaining washer engageable with the end of said inner race and extending radially outward therefrom to a position adapted to bear against the end of said outer race, spring clip means for holding said washer in place comprising a lip adapted to bear against said washer and a sleeve portion adapted to pass through said washer and engage the groove in said aperture, and a mounting bolt having a head adapted to bear against said lip and a shank adapted to pass through said sleeve portion and the aperture in said inner race.

5. A conveyor roller assembly for potato diggers comprising a spindle having a cylindrical shank and an outwardly flared base defining a ball race therebetween, said spindle having an aperture through the center thereof and a circumferentially disposed groove near one end of said aperture, a bell-shaped roller rotatably mounted on said spindle and movable axially thereon, said roller being journaled at its small end on the shank of said spindle and having a second ball race formed in the flared end thereof in complementary relation to said first mentioned ball race, a plurality of balls disposed between and bearing against said races to limit axial movement of said roller in the direction of said spindle base, said balls acting to loosen and break up soil that has entered the bearings, said races having co-axial cylindrical bearing portions permitting a limited amount of relative axial movement, said roller and spindle having clearance therebetween to provide an opening for the escape of such soil, means for limiting axial movement of said outer race away from said spindle base to prevent separation of the roller and spindle and loss of the balls while mounting the roller assembly, said means comprising a retaining washer engageable with the end of said inner race and extending radially outward therefrom to a position adapted to bear against the end of said outer race, spring clip means for holding said washer in place comprising a sleeve portion adapted to pass through said washer and said aperture, a spring catch adapted to engage said groove, a flange adapted to bear against said washer, and a mounting bolt having a head adapted to bear against said flange and a shank adapted to pass through said sleeve portion and the aperture in said spindle.

6. A roller assembly for use in loose soil conditions, comprising a cylindrical spindle member having an outwardly flanged base portion, a hollow roller member coaxially embracing said spindle member and having one end journaled thereupon, the other end of said roller member having an outwardly flared skirt portion adjacent to, but spaced from said base portion of said spindle member, the interior surface of said roller member having an annular recess serving as a ball race, and a plurality of balls disposed in said race and bearing upon said spindle member.

7. A roller assembly for use in loose soil conditions, comprising a cylindrical spindle member having a radially outwardly flanged base portion, a hollow bell-shaped roller member disposed coaxial to said spindle member and rotatable with respect thereto and having one end journaled thereupon, the inside surface of said roller member diverging gradually from said journaled end to the opposite end, there being clearance between said opposite end of said roller member and said base portion of said spindle member, whereby any soil or other foreign material which finds its way into said hollow roller member is urged by centrifugal force, during rotation of the roller, out through said opposite end thereof, there being an annular recess within said roller member serving as a ball race, and a plurality of balls disposed in said race and bearing upon said spindle member.

AUSTIN E. YOUNG.